United States Patent [19]

Imakawa

[11] Patent Number: 5,721,869
[45] Date of Patent: Feb. 24, 1998

[54] DATA PROCESSING APPARATUS WITH FUNCTION OF EFFECTING HANG-UP PROCESSING

[75] Inventor: Tamaki Imakawa, Kawasaki, Japan

[73] Assignee: Fujitsu Limited, Kawasaki, Japan

[21] Appl. No.: 638,853

[22] Filed: Apr. 29, 1996

Related U.S. Application Data

[63] Continuation of Ser. No. 105,685, Aug. 13, 1993, abandoned.

[30] Foreign Application Priority Data

Nov. 27, 1992 [JP] Japan .................... 4-318729

[51] Int. Cl.$^6$ ...................................... G06F 13/00
[52] U.S. Cl. .................. 395/478; 364/241.2; 364/241.6; 364/242.6; 364/242.8
[58] Field of Search ................................. 395/800, 478; 364/242.8, 241.2, 242.6, 241.6

[56] References Cited

U.S. PATENT DOCUMENTS

| | | | |
|---|---|---|---|
| 3,603,935 | 9/1971 | Moore | 340/172.5 |
| 3,993,981 | 11/1976 | Cassarino et al. | 340/172.5 |
| 4,009,470 | 2/1977 | Danilenko et al. | 340/172.5 |
| 4,096,569 | 6/1978 | Barlow | 364/200 |
| 4,511,959 | 4/1985 | Nicolas et al. | 364/200 |
| 4,590,586 | 5/1986 | Zenk et al. | 364/900 |
| 4,633,434 | 12/1986 | Scheuneman | 364/900 |
| 4,644,467 | 2/1987 | McCarthy | 364/200 |
| 4,648,029 | 3/1987 | Cooper et al. | 364/200 |
| 4,730,268 | 3/1988 | Marin | 364/900 |
| 4,787,032 | 11/1988 | Culley | 364/200 |
| 4,787,033 | 11/1988 | Bomba et al. | 364/200 |
| 4,979,099 | 12/1990 | Milia et al. | 364/200 |
| 5,025,370 | 6/1991 | Koegel et al. | 364/200 |
| 5,168,568 | 12/1992 | Thayer et al. | 395/725 |
| 5,193,197 | 3/1993 | Thacker | 395/725 |
| 5,301,283 | 4/1994 | Thacker et al. | 395/325 |
| 5,440,752 | 8/1995 | Lentz et al. | 395/800 |

FOREIGN PATENT DOCUMENTS

| | | |
|---|---|---|
| 0 311 704 | 4/1989 | European Pat. Off. . |
| 0 345 000 | 12/1989 | European Pat. Off. . |
| 84/02210 | 6/1984 | WIPO . |

OTHER PUBLICATIONS

*Patent Abstracts of Japan*, vol. 11, No. 260 (P-608), Aug. 22, 1987 & JP-A-62 063354 (Fujitsu Ltd), Mar. 20, 1987.

Primary Examiner—Jack B. Harvey
Assistant Examiner—Valerie Darbe
Attorney, Agent, or Firm—Staas & Halsey

[57] ABSTRACT

A data processing apparatus with a function of effecting a hang-up processing inhibits detecting retention of an access request as a hang-up, when the access request is accepted by a predetermined port. The apparatus includes a single time counting unit (76) provided in common for hang-up detection circuits (71 to 75). By this constitution, it is possible to reduce the number of hardwares, and to prevent an access request, which should not be detected as a hang-up, from being detected as a hang-up.

8 Claims, 7 Drawing Sheets

DATA PROCESSING APPARATUS WITH FUNCTION OF EFFECTING HANG-UP PROCESSING

This application is a continuation of application Ser. No. 08/105,685, filed Aug. 13, 1993, now abandoned.

BACKGROUND OF THE INVENTION

1. Field of the Invention

The present invention relates to a data processing apparatus with a function of effecting hang-up processing. More particularly, the invention relates to a hang-up processing technique for efficiently processing access requests to a main memory when a data processing apparatus includes a plurality of access points to the main memory.

2. Description of the Related Art

In a conventional data processing apparatus, the order of priority is determined in advance between ports as access points to a main memory. Therefore, when an access request is made to a port having a higher priority, the access request for that port is always and preferentially processed. Accordingly, there occurs the case where, when the access requests to the ports having a higher priority are continuously generated, the access requests to the ports having a lower priority are held by the ports for a long period until the access requests to the ports having a higher priority are interrupted.

In a known data processing apparatus, there occurs, at times, the case where the access requests to the ports having a lower priority are not at all processed and the access requests to the ports having a higher priority are processed without interruption, so that the access to the ports having a lower priority eventually undergoes a "hang-up" state.

In another known data processing apparatus (see Japanese Unexamined Patent Publication No. 2-58149), time counting means is necessary for each port and eventually, the number of required hardwares increases. Furthermore, the access request which should not be detected as hang-up is erroneously detected as hang-up depending on the content of the access request.

Note, the problems in the prior art will be explained later in detail in contrast with the preferred embodiments of the present invention.

SUMMARY OF THE INVENTION

An object of the present invention is to provide a data processing apparatus with a function of effecting a hang-up processing, which can reduce the number of hardwares on the basis of the technical concept that a single time counting means is disposed in common for all ports.

Another object of the present invention is to provide a data processing apparatus which can prevent an access request, which should not be detected as hang-up, from being detected as hang-up.

According to the present invention, there is provided a data processing apparatus having a hang-up processing function, comprising: a plurality of access request sources; a main memory interleaved with a plurality of banks; a plurality of ports for accepting access requests from said access request sources to said main memory; hang-up detection circuits provided for each of said ports, for detecting an access request as a hang-up when said access request held by a corresponding port is held for a predetermined time or more; a hang-up processing circuit for inhibiting transmission of an access request from another port until said access request from said other port, which has detected a hang-up by receiving the outputs of said hang-up detection circuits and the outputs of said ports, is transmitted to said main memory; a priority determination circuit for determining the order of priority of said access requests; an access processing part for transmitting access requests held by said ports to said main memory in accordance with the order of priority determined by said priority determination circuit; and a single time counting means provided in common for said hang-up detection circuits; all of said ports detecting a hang-up at an identical timing based on the output of said time counting means.

BRIEF DESCRIPTION OF THE DRAWINGS

Other objects and features of the present invention will be described hereinafter in detail by way of preferred embodiments with reference to the accompanying drawings, in which.

DESCRIPTION OF THE PREFERRED EMBODIMENTS

Throughout the description, identical references used in connection with the drawings indicate like constituent elements, and thus the description of explanation thereof is omitted.

First, for better understanding of the preferred embodiment of the present invention, the related prior art will be explained with reference to FIG. 1.

Figure 1:
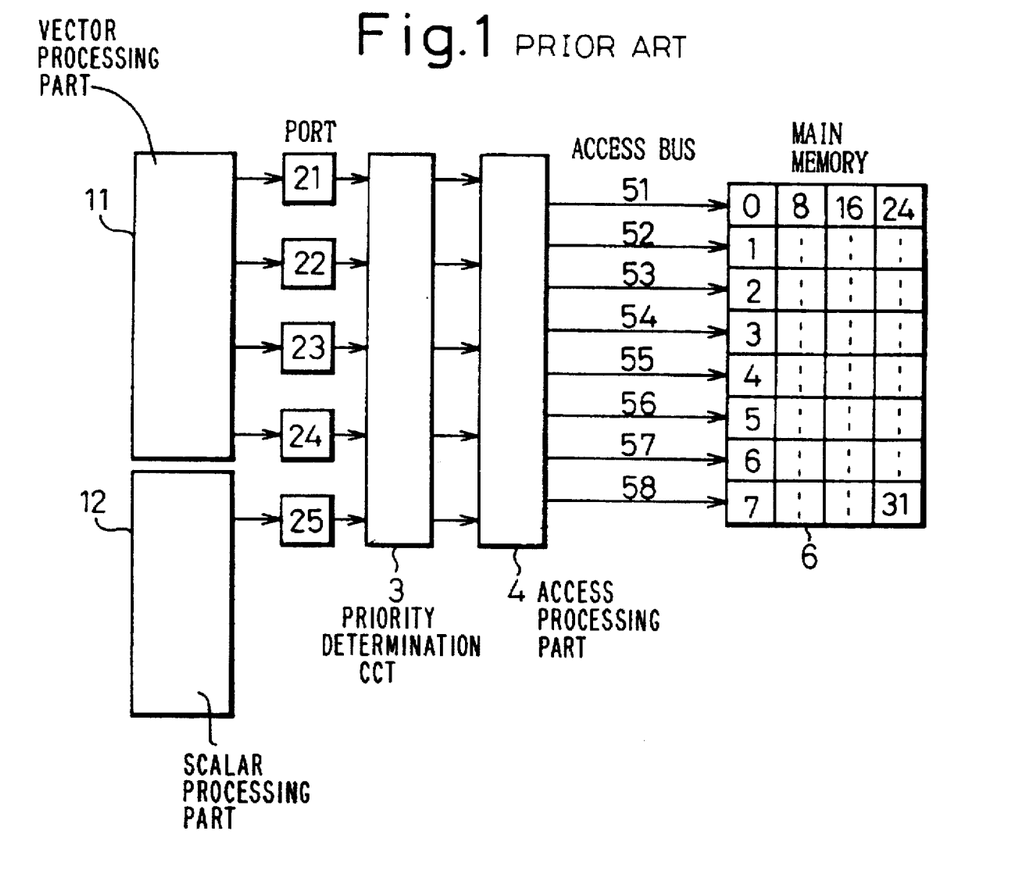
FIG. 1 is a block diagram showing the constitution of a prior art data processing apparatus.

FIG. 1 shows an example of the data processing apparatus according to the prior art.

In the drawing, the data processing apparatus employs a vector processing part 11 and a scalar processing part 12 as access request sources, and ports 21 to 24 and a port 25 of a priority determination circuit 3 are so disposed as to correspond to these access request sources 11 and 12, respectively. Eight access buses 51 to 58, the four of which form a set, are spread in the transverse direction of the drawing from an access processing part 4 for a main memory 6 interleaved into 32 banks of banks 0 to 31 so that simultaneous access can be made to eight banks. Priority between the ports is so set as to satisfy the relation 25>21 to 24.

The priority determination circuit 3 determines an access request of the port, for which access processing must be made, on the basis of priority between the ports, competition of access bus between the ports and the busy state of the main memory. Here, the term "competition of access bus between the ports" means competition of the access bus used by the access request at each port, and when this competition exists, the access request of the port having higher priority between the ports is preferentially processed. The busy state of the main memory 6 is monitored for each interleaved bank, and when an access is made to a certain bank, this bank becomes busy for a predetermined period and other access request to this bank is inhibited.

The access request originating from the vector processing part 11 or from the scalar processing part 12 includes the following block access, single access and random access. The access request from the vector processing part 11 uses an access to one bank as a unit, and at least one unit (such as 256 units) is always generated continuously as a series of accesses:

① block access (read/write)

This access is transmitted from the vector processing part 11 or from the scalar processing part 12 to one corresponding port, and read or write is simultaneously effected to eight banks of one column of the memory 6 (such as the banks 0 to 7). In other words, since eight access buses 51 to 58 are simultaneously used by one block address, this block access cannot be transmitted if any one of the eight buses is busy or competes with other bus and cannot therefore be used. This access request is transmitted, for example, from the vector processing part 11 to the port 21 of the priority determination circuit 3 and from the scalar processing part 12 to the port 25. Eight units of a series of accesses from the vector processing part 11 are simultaneously processed.

② single access (read/write)

This access is transmitted from the vector processing part 11 or from the scalar processing part 12. Write or read is effected to and from one arbitrary bank of the main memory 6. Only one access bus is used for one single access. This access request, too, is transmitted from the vector processing part 11 to the port 21 of the priority determination circuit and from the scalar processing part 12 to the port 25.

③ random access (read/write)

This access is transmitted only from the vector processing part 11. The single access is simultaneously transmitted to the ports 21 to 24 of the priority determination circuit. Write or read is simultaneously effected to and from maximum four banks by one random access. Maximum four access buses are used. This is a series of discontinuous accesses to the main memory region. First, the access request is simultaneously made to the ports 21 to 24 and thereafter the access request is sequentially transmitted to the empty port or ports. The priority determination circuit processes the access request while insuring the sequence of 21→22→23→21. . . . . . In other words, when any access request which cannot be transmitted due to competition between the ports or due to the busy condition exists, transmission of the access request to the ports positioned sequence-wise downstream of that port is inhibited.

In the data processor described above, when the access request transmitted to the port having higher priority is the continuous single access to the same bank, for example, that bank is always used for only the access request of the port 25, and the access to that bank from other ports is substantially impossible unless the access request of the port 25 moves to other bank or the access request is interrupted.

The following processing is assumed, by way of example:
10: vector store
20: store of CPU
30: vector store is not completed; THEN, GO TO 20: 40: X ... ...

In the processing described above, the processing of "20: store of CPU" has a higher processing speed than that of "10: vector store". Therefore, step 20 is completed before completion of the execution of "10: vector store" and moves to step 30. Then, the processing of "10: vector store" is not completed for ever so long as the steps 20 and 30 are repeated, depending on the condition of the step 30. This condition is referred to as "hang-up".

To detect such hang-up, a system is known conventionally which disposes time counting means in each port, counts the retention time of the access request at each port, and detects the case where the access request is retained over a predetermined period time, as hang-up, or changes priority of the access request to higher priority (see Japanese Unexamined Patent Publication No. 2-58149).

When the time counting means is not disposed in the port, there occurs the problem that when a program in which the condition of the termination of the access request to a port having higher priority is the termination of processing of the access request to port having lower priority can be described, the access request to the port having lower priority cannot at all be processed and the accesses to the ports having higher priority are continuously processed without interruption, so that the accesses to the ports having lower priority eventually undergoes hang-up.

According to the prior art system described above which disposes the time counting means in each port, the time counting means is necessary for each port. Therefore, when the number of ports increases, the number of the time counting means increases, too, and there occurs the problem that the number of hardwares increases. Depending on the content of the access request, the access request is sometimes retained at the port beyond the predetermined time described above even when hang-up does not occur. Therefore, if the passage of time beyond the predetermined time is all detected by the time counting means as hang-up, those access requests which should not be detected as hang-up are detected as hang-up.

Figure 2:
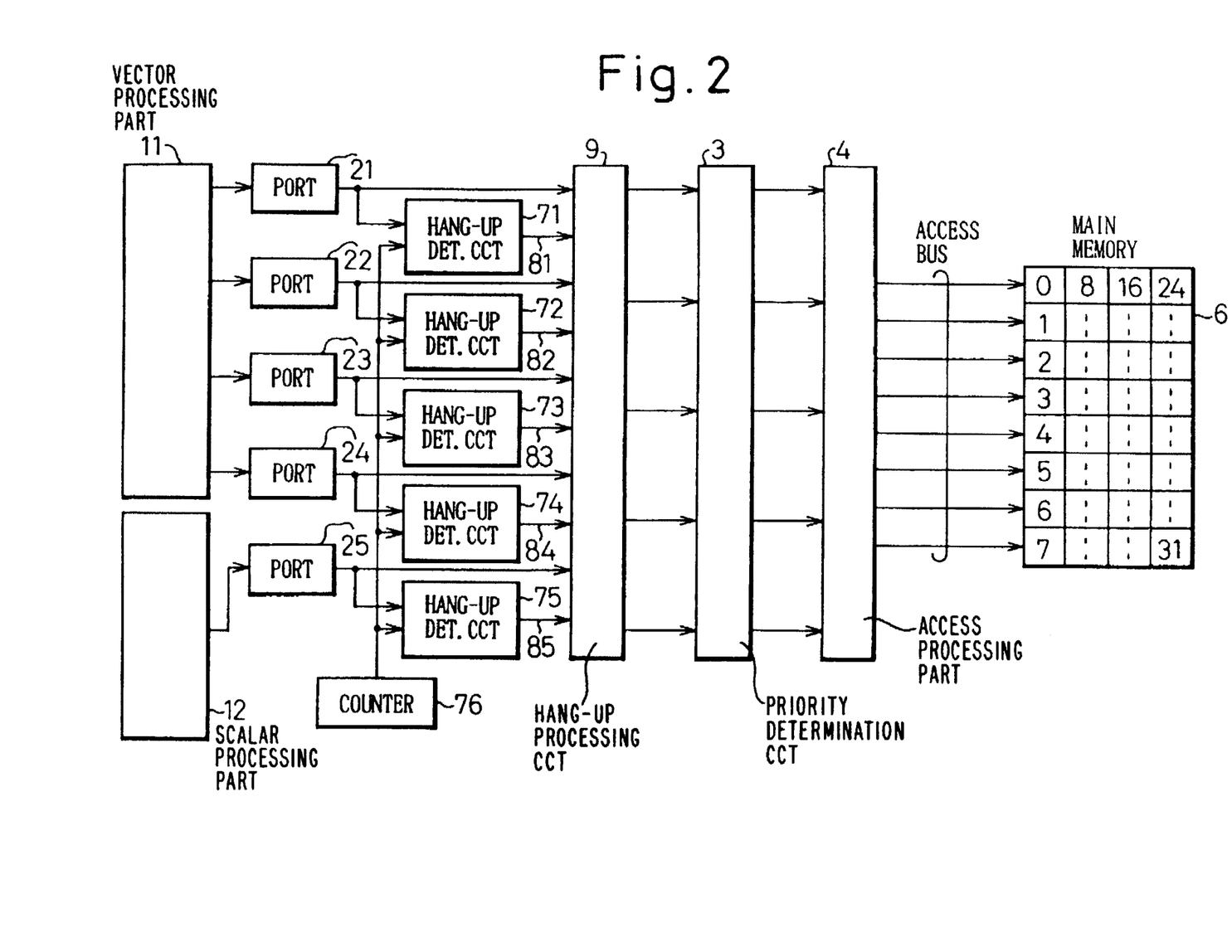
FIG. 2 is a block diagram for explaining the principle of the present invention.

FIG. 2 illustrates the construction of principle of the data processing apparatus equipped with the hang-up processing function according to the present invention.

In the illustration, reference numerals 11 and 12 denote a plurality of access request sources, reference numeral 6 denotes a main memory interleaved into a plurality of banks, reference numerals 21 to 25 denote a plurality of ports for accepting the access requests to the main memory 6 from the access request sources, reference numerals 71 to 75 denote a hang-up detection circuit for detecting the access request as hang-up when the access request retained at each port is retained beyond a predetermined time, reference numeral 9 denotes a hang-up processing circuit which inhibits transmission of the access requests from other ports until the access request is transmitted from the port, at which hang-up is detected, to the main memory 6 by receiving the outputs of the hang-up detection circuits 71 to 75 and the outputs from the ports 21 to 25, reference numeral 3 denotes a priority determination circuit for determining priority of the access requests, and reference numeral 4 denotes an access processing part for transmitting the access requests retained at the ports 21 to 25 to the main memory 6 in accordance with priority determined by the priority determination circuit 3.

According to one aspect of the present invention, means for inhibiting holding of an access request, when such an access request is held by a predetermined port, from being detected as hang-up, is disposed in the hang-up detection circuits 71 to 75.

The hang-up detection circuits 71 to 75 are so disposed as to correspond to the ports, respectively. The priority determination circuit 3 determines priority on the basis of the content of the access request from each port, competition between the ports, predetermined priority between the ports and the busy state for each bank of the main memory 6.

According to another aspect of the present invention, single time counting means 76 is disposed in common for the hang-up detection circuits 71 to 75 so as to detect hang-up at all the ports at the same timing.

Each of the hang-up detection circuits 71 to 75 inputs a port valid signal, which represents whether or not any access request exists for the corresponding port, and a port release signal, which represents whether or not the access request existing at the port is transmitted to the main memory 6 at the next timing, and triggers these port valid signal and port release signal by a signal having a predetermined cycle from the time counting means 76.

When the port, hang-up of which is detected by the hang-up detection circuit 71, is only one, the hang-up processing circuit 9 gives priority only to the access request of that port, and inhibits transmission of the access requests of other ports until this access request is transmitted. When two or more ports, hang-up of which is detected, exist, the hang-up processing circuit 9 executes processing for one port by one in accordance with predetermined priority, and thus avoids hang-up in the priority determination circuit.

When priority guarantee of access request processing is necessary between a plurality of specific ports, the hang-up processing circuit 9 allows all of a plurality of ports to transmit the access request to the main memory 6 when the hang-up detection circuits 71 to 75 detect hang-up of at least one port among a plurality of ports, and can thus guarantee priority.

After the hang-up detection circuits 71 to 75 detect hang-up, the hang-up processing circuit 9 inhibits detection of hang-up of all the ports until hang-up of one of a plurality of ports, which are detected simultaneously at that time, is solved.

According to the aspect of the present invention described above, the number of hardwares can be reduced because only one time counting means is disposed in common for all the ports.

According to another aspect of the present invention described above, the access request held at a predetermined port is not handled as hang-up even when it is held beyond the predetermined time.

Next, the preferred embodiments of the present invention will be explained with reference to FIGS. 2 to 7.

The constitution shown in FIG. 2 is obtained by adding the following circuits to the data processing apparatus of the prior art example shown in FIG. 1:

① hang-up detection circuits 71 to 75 hang-up detection signals 81 to 85

② hang-up processing circuit 9

First, the hang-up detection circuits 71 to 75 will be explained.

Each of the hang-up detection circuits 71 to 75 counts the time of retention of the access request at each port, and when this retention time exceeds the predetermined time, each hang-up detection circuit renders the hang-up detection signal "1" as detecting hang-up. The retention time of the access request at each port can be easily measured for each port by disposing a counter to each port. However, when the number of the ports increases, the physical quantity of the counters will become a problem. Therefore, in the circuit shown in FIG. 2, only one counter 76 is disposed for counting the time, and is used in common for all the ports.

Figure 3:
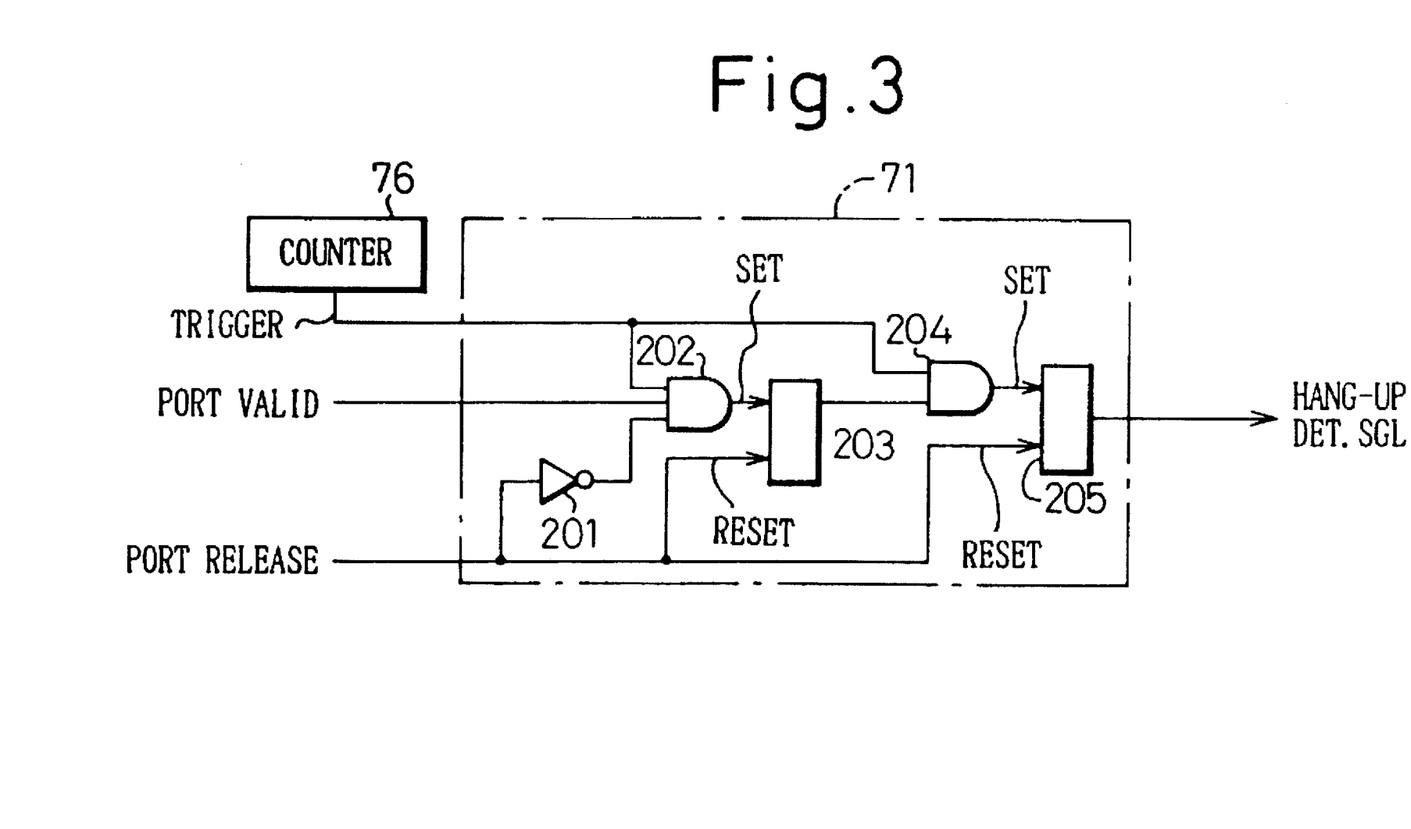
FIG. 3 is a circuit diagram showing the constitution of the hang-up detection circuit according to an embodiment of the present invention.

FIG. 3 is a circuit diagram of the hang-up detection circuit 71 in one embodiment of the present invention. The other hang-up detection circuits 72 to 75 have the same circuit construction. In FIG. 3, the output of the counter 76 is used for triggering the carrier of the counter for setting a latch circuit 203 of a hang-up anticipation flag and a latch circuit 205 for a hang-up detection flag but is not used for directly measuring the retention time at the port 21 by the counter. Meaning of each signal in FIG. 3 is as follows.

"Port valid" means a signal representing that the access request exists at the port, "port release" means a signal representing that the access request existing at the port is transmitted to the memory at the next timing, and "trigger" means a carry-up signal of the counter.

The operation of the circuit shown in FIG. 3 will be explained. It will be hereby assumed that the latch circuit 203 for the hang-up anticipation flag and the latch circuit 205 for the hang-up detection flag are all reset to "0". When the access request is made to the corresponding port 21 at the timing when the trigger becomes "1" (the port valid is "1") and moreover, when it is not transmitted at the next timing (the port release is "0"), then, the port release is inversed to "1" by the inverter 201 and the three inputs (trigger, port valid and inversion signal of port release) of an AND gate 202 all become "1", and the output of the latch circuit 203 for the hang-up anticipation flag is set to "1". Next, when the access request is transmitted (when the port release becomes "1") before the trigger becomes "1" (with the number of time counts by the counter being $N\tau$), the latch circuit 203 for the anticipation flag is reset. When the trigger becomes "1" while the latch circuit 203 for the anticipation flag is not reset, the latch circuit 205 for the detection flag is set this time. Then, when the access request held at the port 21 is transmitted to the main memory by the hang-up processing (when the port release becomes "1"), both of the latch circuit 203 for the anticipation flag and the latch circuit 205 for the detection flag are reset. When the retention time of the access request at the port by this circuit exceeds $N\tau$, hang-up is detected in some cases and when the retention time exceeds $2N\tau$, hang-up is always detected. In this circuit, detection of hang-up does not occur continuously within a short time but occurs with the minimum interval $N\tau$. Accordingly, the proportion of the hang-up processing in the overall access processing is limited to a relatively low level.

Figure 4:
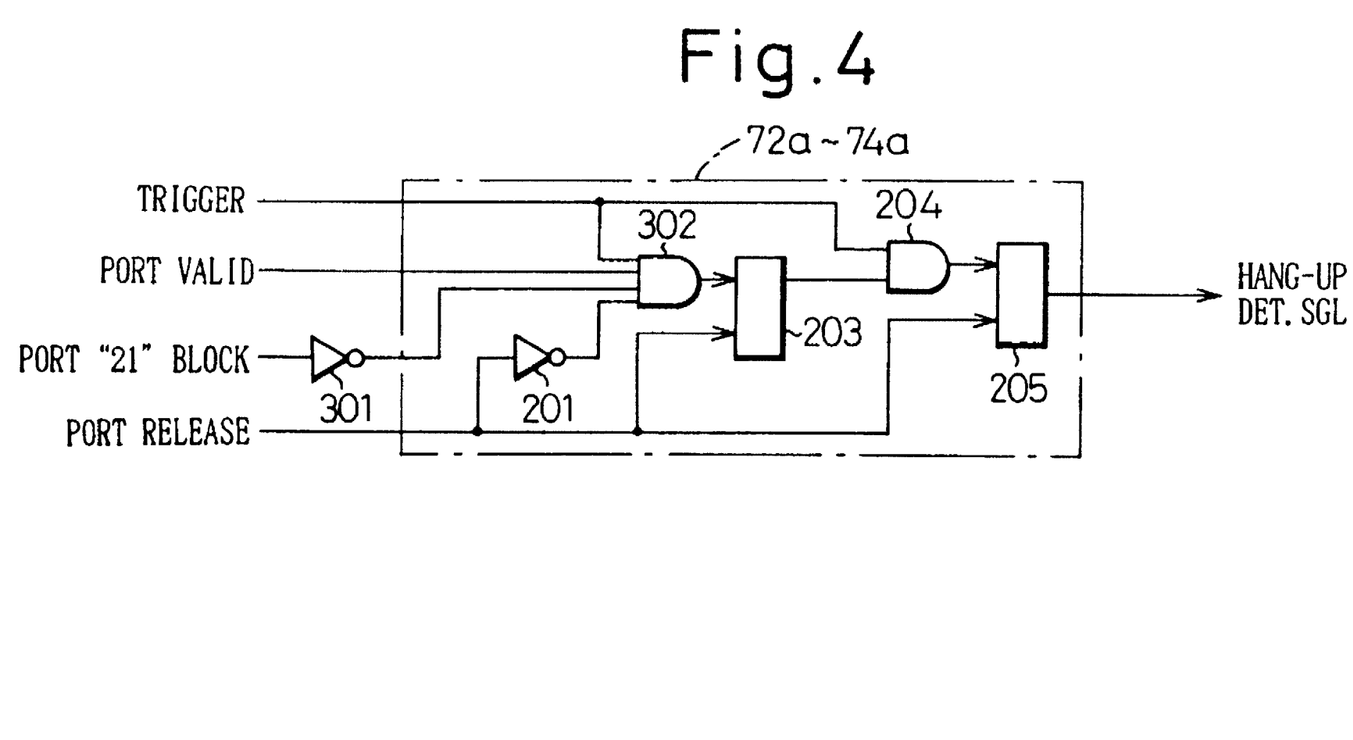
FIG. 4 is a circuit diagram showing the constitution of the hang-up detection circuit according to another embodiment of the present invention.

FIG. 4 is a circuit diagram of the hang-up detection circuit in another embodiment of the present invention. When the hang-up detection circuit shown in FIG. 3 is so disposed as to correspond to each port, there exists the case where the block access request and the random access request are simultaneously transmitted from the vector processing part 11. For example, when a series of long block access request precedently exists, this block access request is continuously transmitted to the port 21. The subsequent random access utilizes the ports 21 to 24, and since the ports 22 to 24 are not utilized for the block access, the access request can be transmitted, and the vector processing part 11 transmits the access request. However, before the first access request unit reaches the port 21 for the priority guarantee, the access requests at the ports 22 to 24 cannot be transmitted to the main memory 6, and might be retained for a long time at these ports 22 to 24. This retention of the access request for a long time at the ports 22 to 24 cannot be processed as hang-up. Therefore, when the precedent block access request is transmitted to the port 21, hang-up detection of the ports 22 to 24 is inhibited. In practice, in the hang-up detection circuit corresponding to the ports 22 to 24 shown in FIG. 4, the set signal of the hang-up anticipation flag 203 is inhibited by the use of a signal (port 21 block) which becomes "1" when the port 21 is the precedent block access. In other words, "1" of the port 21 block is inverted by an inverter 301 and is then inputted to the AND gate 302, so that the output of the AND gate 302 is fixed to "0". Accordingly, the latch circuit 203 for the hang-up anticipation flag is not set to "1".

Next, the hang-up processing circuit will be explained.

Figure 5:
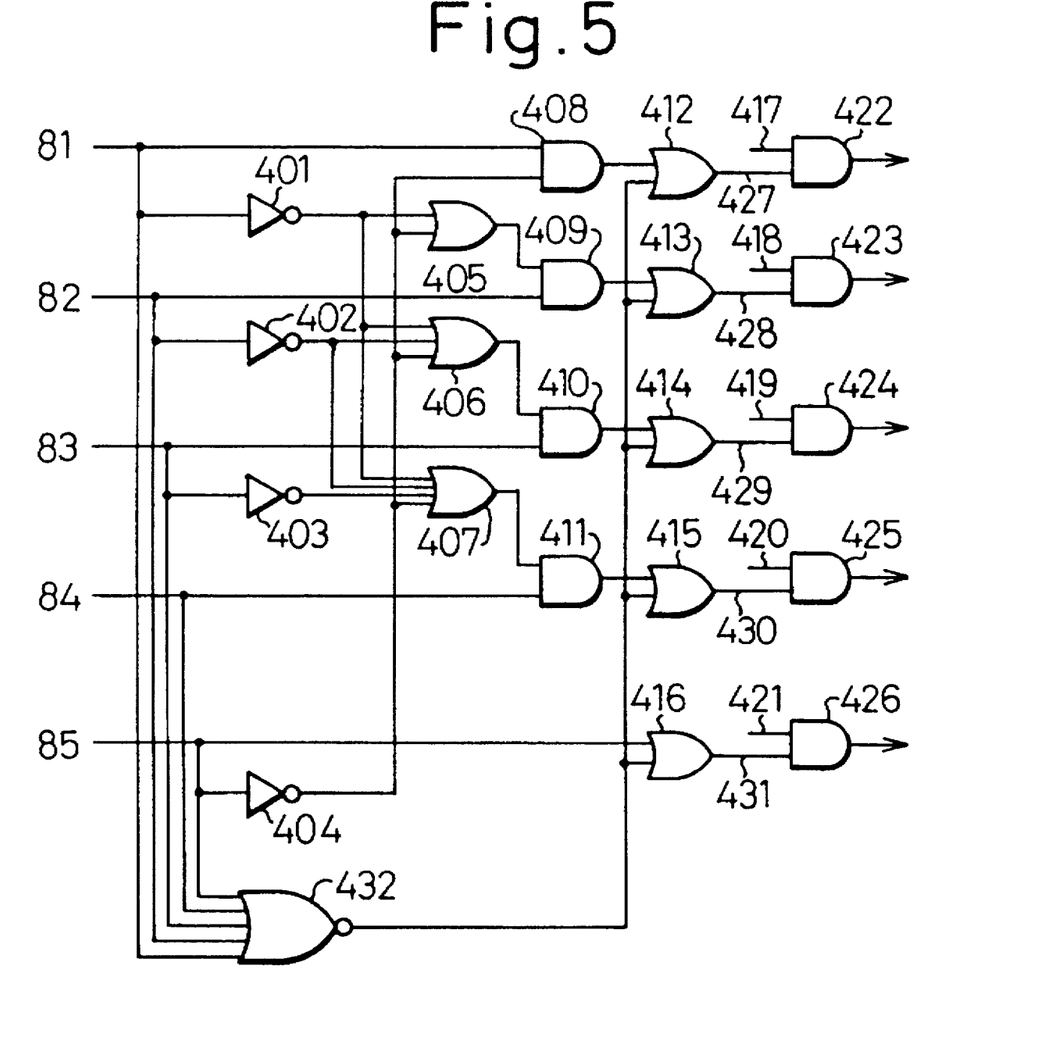
FIG. 5 is a circuit diagram showing the constitution of the hang-up processing circuit according to an embodiment of the present invention.

FIG. 5 is a circuit diagram of the hang-up processing circuit in one embodiment of the present invention. The hang-up processing circuit receives the hang-up detection output, and solves hang-up by substantially executing the following processings:

①  When only one port detects hang-up:

Transmission of the access request to the main memory 6 from the ports other than the port which detects hang-up is inhibited. This state continues till the access request of the port detecting hang-up is transmitted to the main memory 6 and the hang-up detection flag is reset.

For example, when only the hang-up detection signal 81 becomes "1", the hang-up detection signal 85, which is "0", is inverted to "1" by the inverter 404, and "1" of the hang-up detection signal 81 passes through the AND gate 408 and the OR gate 412. Since "1" of the port 21 valid is inputted to the input 417 of the AND gate 422, the hang-up detection signal 81 is outputted from the AND gate 422 to the priority processing circuit 3 (see FIG. 2). Since the hang-up detection signals 82 to 85 of the other ports are all "0", the outputs of the AND gates 409 to 411 and 426 are all "0".

②  When a plurality of ports detect hang-up:

Processing similar to the processing 1 is executed for the port having the highest priority among those ports which detect hang-up. Namely, the hang-up detection signal 85 is outputted from the AND gate 426, and when hang-up is solved for the port 25, the hang-up detection signal 85 becomes "0". This logic is inverted to "1" by the inverter 404 and changes the AND gate 408 to ENABLE. The hang-up detection signal 81 passes through the AND gate 408 and the OR gate 412. Since the AND gate 422 is changed to ENABLE by the port-21-valid 417, the hang-up detection signal 81 is outputted to the priority processing circuit 3 through the AND gate 422. Next, when hang-up of the port 21 is solved, the hang-up detection signal 81 becomes "0", and this logic changes the AND gate 409 to ENABLE through the OR gate 405, so that the hang-up detection signal 82 passes through the AND gate 409, the OR gate 413 and the AND gate 423. Next, when hang-up of the port 22 is thus solved, the hang-up detection signal becomes "0", and this logic changes the AND gate 410 to ENABLE through the OR gate 406, so that the hang-up detection signal 83 passes through the AND gate 410, the OR gate 414 and the AND gate 424, and is sent to the priority processing circuit 3. Next, when hang-up of the port 23 is solved, the hang-up detection signal 83 becomes "0", and the hang-up detection signal 4 passes through the AND gates 410 and 424 and is sent to the priority processing circuit 3. In this way, the processing similar to the processing 1 is sequentially carried out from the port having the highest priority. When the hang-up detection flag is reset, processing proceeds to the port having the second highest priority. This processing is continued until all the hang-up detection flags are reset. By the way, the hang-up detection signals 81 to 85 are all inputted to the NOR gate 432. Accordingly, when all the hang-up detection signals 81 to 85 are "0", the logic "1" is outputted from the NOR gate 432, passes through the OR gate 412 to 416 and changes all the ENABLE ports 21 to 25 to "1". Therefore, when no hang-up is detected, existence/absence of the access request at the ports 21 to 25 is directly reported to the priority circuit 3.

In the case of the access request for which sequence guarantee between the ports is necessary such as the random access from the vector processing part 11, there is no problem if hang-up is detected for all the ports 21 to 24. However, when hang-up is detected for a part of the ports 21 to 24, there occurs the case where the access sequence is not guaranteed when the processing such as ② is executed. In such a case, therefore, the access sequence is guaranteed by executing a processing so that hang-up is regarded as being detected for the port or ports for which hang-up is not actually detected, without executing individually the ports 21 to 24.

Figure 6:
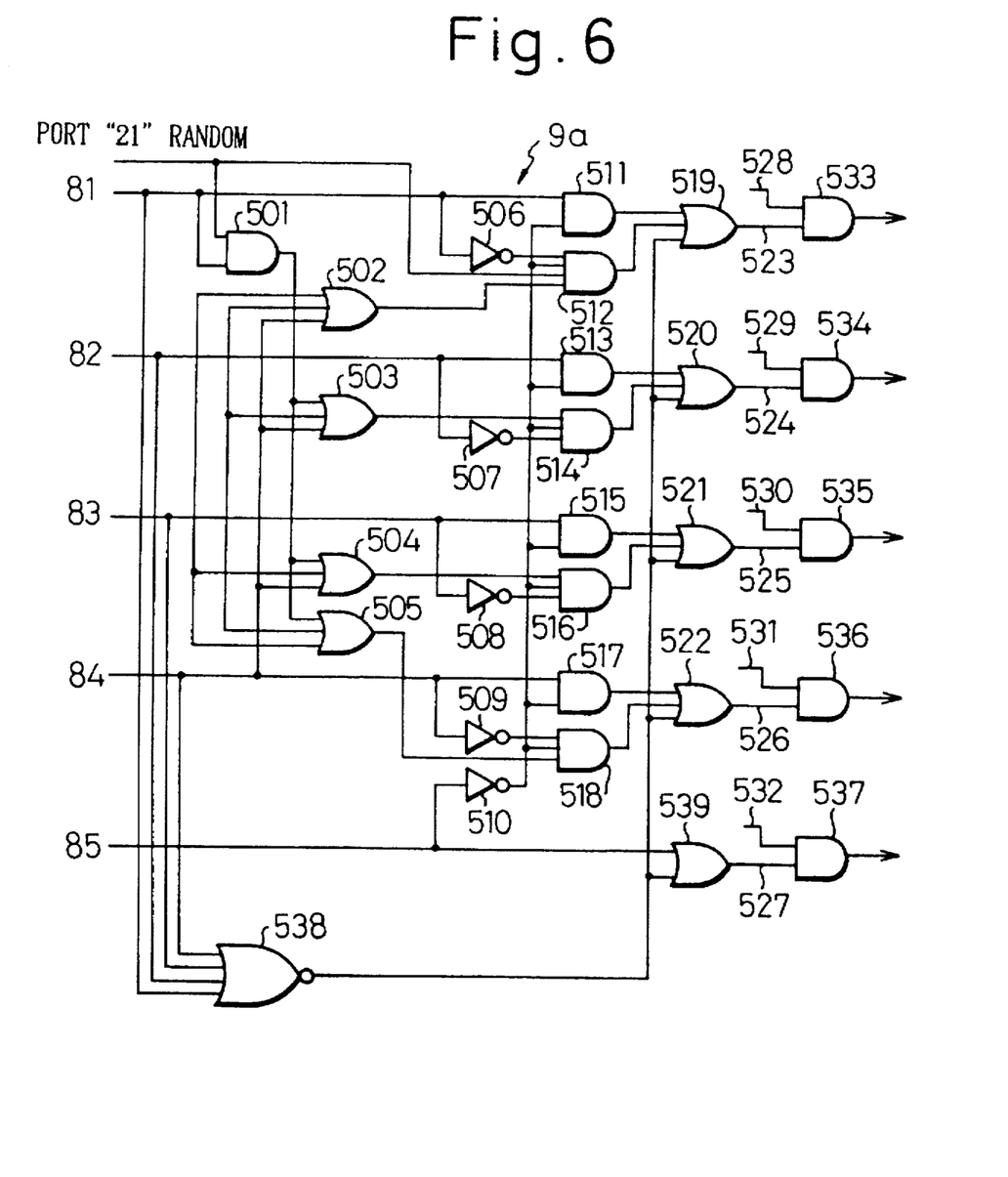
FIG. 6 is a circuit diagram showing the constitution of the hang-up processing circuit according to another embodiment of the present invention.

FIG. 6 shows a hang-up processing circuit according to another embodiment of the present invention which takes the case described above into consideration. In the processing circuit shown in FIG. 6, the hang-up detection circuit shown in FIG. 3 is used for the ports 21 and 25, and the hang-up detection circuit shown in FIG. 4 is used for the ports 22 to 24. In other words, the ports 21 to 24 are utilized for the random access and when the block access is given to the port 21, hang-up detection of the ports 22 to 24 is inhibited.

Meanings of various signals shown in FIG. 6 are as follows.

The term "hang-up detection signals 81 to 85" represents the outputs of the hang-up detection flags of the ports 21 to 25, the term "port-21-random" represents the signal which becomes "1" when the access request of the port 21 is the random access, and the term "port-21-25-valid" represents the signal which becomes "1" when the access requests exist at the ports 21 to 25.

The port-21-random signal is an inversion signal of the port-21-block. To simplify explanation, it will be hereby assumed that the accesses are two kinds, that is, the block access and the random access. Therefore, when the port-21-block is "1", the port-21-random is "0".

When the port-21-random is "1" and when any one of the hang-up detection signals 81 to 84 is "1", all the ENABLE ports 21 to 24 become "1", and priority exists between the port 25 and the ports 21 to 24.

In other words, when the hang-up detection signal 85 becomes "1", it is outputted to the priority circuit 3 through the OR gate 539 and the AND gate 537, and next when the hang-up detection signal 85 becomes "0", the logic "1" is inputted to the AND gates 511 to 518 through the inverter 510.

When the hang-up detection signal 81 becomes "1" and other signals 82 to 84 become "0" under this state, for example, the signal 81 is outputted to the priority circuit 3 through the AND gate 511, the OR gate 519 and the AND gate 533. At the same time, the signal 81 is outputted as the hang-up detection signal 82 to the priority circuit 3 through the AND gate 501, the OR gate 503, the AND gate 514, the OR gate 520 and the AND gate 534. Since the logic "0" of the hang-up detection signal 82 is inverted and inputted to the input of the AND gate 514, the AND gate 514 is under the ENABLE condition.

Similarly, "1" of the hang-up detection signals is outputted from other AND gates 535 and 536.

When only the hang-up detection signal 82 is "1" and other hang-up detection signals are "0", too, "1" of the hang-up detection signals is outputted from all the AND gates 533 to 536.

When the port-21-random is "0", the port-21-block is "1" and for this reason, hang-up detection of the hang-up detection circuit shown in FIG. 4 is inhibited. Accordingly, the hang-up detection signals 82 to 84 are all "0". Since the port-21-random is "0", the output of the AND gate 501 is "0", and the hang-up detection signals 83 and 84 are "0", too, so that the outputs of the OR gates 503, 504 and 505 are also "0". Accordingly, the AND gates 512 to 518 are DISABLE. As a result, when the hang-up detection signal 85 becomes "0" after it is outputted from the AND gate 537, only the hang-up detection signal 81 passes through the AND gate 511, the OR gate 519 and the AND gate 533 and is outputted to the priority circuit 3, and the hang-up detection signals 82 to 84 are not outputted from the AND gates 534 to 536, respectively.

The ENABLE ports 21 to 25 represented by 523 to 527 are the signals which permit the access request transmission from the ports 21 to 25, respectively, and the access request can be transmitted because the access request appears for the priority determination circuit to exist at the port only when the ENABLE port signal is "1". By the way, in FIG. 6, too, the hang-up detection signals 81 to 85 are all inputted to the NOR gate 538. Accordingly, when all the hang-up detection signals 81 to 85 are "0", "1" is outputted from the NOR gate 38 and this logic passes through the OR gates 519 to 539 and changes the ENABLE ports 21 to 25 to "1". Therefore, when no hang-up is detected, presence/absence of the access request at these ports 21 to 25 is directly reported to the priority circuit 3.

According to the circuit shown in FIG. 5, the hang-up processing is executed in accordance with priority of the ports. Therefore, when hang-up is detected at the port having higher priority during the hang-up processing, the processing cannot be completed normally. Accordingly, contrivances for not detecting hang-up during the hang-up elimination processing are necessary.

Figure 7:
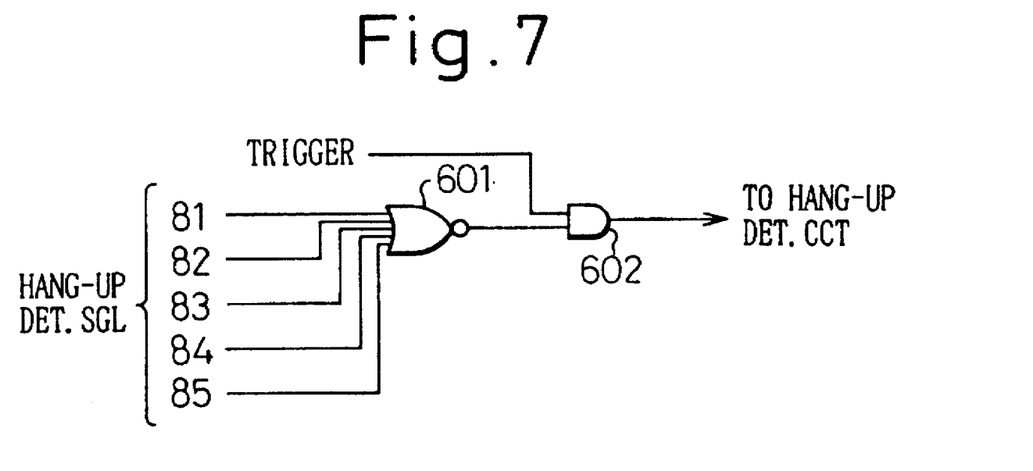
FIG. 7 is a circuit diagram showing the constitution of the hang-up detection inhibiting circuit in each embodiment of the present invention.

FIG. 7 is a circuit diagram of the hang-up detection inhibiting circuit in each embodiment of the present invention, which inhibits detection of hang-up during the hang-up elimination processing. In the circuit diagram, whether or not the hang-up processing is being executed is detected by OR of all the hang-up detection signals 81 to 85 by the NOR circuit 601, and when any of the hang-up detection signals is "1", the AND gate 602 restricts the carry-up signal (trigger) of the counter. The output of this AND gate 602 is applied as the trigger as one of the inputs to the hang-up detection circuit shown in FIG. 3 or FIG. 4 so that the AND gate 204 enters the DISENABLE state when any one of the hang-up detection signal is "1".

Although the present invention has been disclosed and described by way of a number of embodiments, it is apparent to those skilled in the art that other embodiments and modifications of the present invention are possible without departing from the spirit or essential features thereof.

I claim:

1. A data processing apparatus having a hang-up processing function, comprising:

a plurality of access request sources;

a main memory interleaved with a plurality of banks;

a plurality of ports accepting access requests from said access request sources to said main memory;

hang-up detection circuits coupled to and provided for each of said ports, and detecting an access request as a hang-up when said access request held by a corresponding port is held for a predetermined time or more;

a hang-up processing circuit inhibiting transmission of an access request from another port until said access request from said other port, which has detected a hang-up by receiving the outputs of said hang-up detection circuits and the outputs of said ports, is transmitted to said main memory;

a priority determination circuit determining the order of priority of said access requests;

an access processing part transmitting access requests held by said ports to said main memory in accordance with the order of priority determined by said priority determination circuit; and single time counting means provided in common for said hang-up detection circuits and for indicating detection timing; and all of said ports detecting a hang-up at an identical timing based on the output of said time counting means.

2. An apparatus according to claim 1, wherein each of said hang-up detection circuits includes first hang-up latch means which is set by a port valid signal representing whether or not an access request exists at the corresponding port, triggered by a signal having a predetermined cycle output from said time counting means, and which is reset by a port release signal representing whether or not said access request existing at said port has been transmitted to said main memory at the next timing.

3. An apparatus according to claim 2, wherein each of said hang-up detection circuits includes second hang-up latch means which is set by the output of said first hang-up latch means, triggered by a signal having a predetermined cycle output from said time counting means, and which is reset by said port release signal.

4. An apparatus according to claim 3, wherein at least one of said hang-up detection circuits includes means for inhibiting detecting the holding of an access request to a port corresponding to said at least one hang-up detection circuit, as a hang-up, when said access request is held by a predetermined one of said ports.

5. An apparatus according to claim 1, wherein said hang-up processing circuit gives priority only to an access request to a port and inhibits transmission of access requests by other ports until said access request is transmitted, when said port at which said hang-up detections circuits detect a hang-up is only one, and said hang-up processing circuit executes one port by one a similar processing in accordance with a predetermined priority and avoids hang-up in said priority determination circuit, when the ports at which a hang-up is detected are two or more.

6. An apparatus according to claim 4, wherein said hang-up processing circuit assures the priority by bringing access requests from all of said ports to said main memory into a transmittable state, when said hang-up detection circuits detect a hang-up at least one of said ports where the priority assurance is necessary for access request processings between a plurality of specific ports.

7. An apparatus according to claim 1, wherein said hang-up processing circuit includes means for inhibiting a detection of hang-up at all of said ports until a hang-up at least one of said ports is fully removed after said hang-up detection circuits detect the hang-up.

8. An apparatus according to claim 1, wherein said priority determination circuit determines said order of priority on the basis of the content of an access request at each port, competition between said ports, a predetermined order of priority between said ports, and a busy state to each bank of said main memory.

* * * * *

UNITED STATES PATENT AND TRADEMARK OFFICE
CERTIFICATE OF CORRECTION

PATENT NO. : 5,721,869
DATED : Feb. 24, 1998
INVENTOR(S) : IMAKAWA

It is certified that error appears in the above-identified patent and that said Letters Patent is hereby corrected as shown below:

Col. 10, line 51 (Claim 6, line 5), after "at" insert --at--;
        line 56 (Claim 7, line 3), after "at" insert --at--.

Signed and Sealed this

Twenty-third Day of June, 1998

Attest:

BRUCE LEHMAN

*Attesting Officer*      *Commissioner of Patents and Trademarks*